(12) United States Patent
Lamothe et al.

(10) Patent No.: US 8,467,417 B2
(45) Date of Patent: Jun. 18, 2013

(54) METHOD AND SYSTEM FOR SYNCHRONIZATION BETWEEN NETWORK ELEMENTS

(75) Inventors: Philippe Lamothe, Gatineau (CA); Michel Ouellette, Orleans (CA); Marc-André Rochon, Gatineau (CA)

(73) Assignee: Rockstar Consortium US LP, Plano, TX (US)

( * ) Notice: Subject to any disclaimer, the term of this patent is extended or adjusted under 35 U.S.C. 154(b) by 1138 days.

(21) Appl. No.: 11/782,895

(22) Filed: Jul. 25, 2007

(65) Prior Publication Data

US 2008/0273460 A1      Nov. 6, 2008

Related U.S. Application Data

(60) Provisional application No. 60/915,750, filed on May 3, 2007.

(51) Int. Cl.
*H04J 3/06* (2006.01)

(52) U.S. Cl.
USPC ........................................................ 370/503

(58) Field of Classification Search
USPC ... 370/503–516; 375/294, 327, 397; 713/375, 713/500–503, 600, 601
See application file for complete search history.

(56) References Cited

U.S. PATENT DOCUMENTS

| | | | | |
|---|---|---|---|---|
| 3,967,058 A | * | 6/1976 | Moriya et al. | 370/294 |
| 5,675,584 A | * | 10/1997 | Jeong | 370/284 |
| 5,790,608 A | * | 8/1998 | Benayoun et al. | 375/356 |
| 6,608,896 B2 | * | 8/2003 | Felder et al. | 379/386 |
| 6,775,300 B2 | * | 8/2004 | Kuo | 370/503 |
| 6,836,851 B2 | * | 12/2004 | Dive | 713/400 |
| 6,910,145 B2 | * | 6/2005 | MacLellan et al. | 713/400 |
| 6,952,399 B1 | | 10/2005 | Bayerl et al. | |
| 7,139,264 B1 | * | 11/2006 | Slater | 370/353 |
| 7,593,327 B2 | * | 9/2009 | Bordogna et al. | 370/230 |

(Continued)

OTHER PUBLICATIONS

AMD, Am79C973/Am79C975, PCnet™—Fast III, Single-Chip 10/100 Mbps PCI Ethernet Controller with Integrated PHY, Aug. 2000, Publication# 21510, 304 pages.

(Continued)

*Primary Examiner* — Mark Rinehart
*Assistant Examiner* — Angel Brockman
(74) *Attorney, Agent, or Firm* — Withrow & Terranova, PLLC

(57) ABSTRACT

A system for synchronizing a first network device and a second network device. The first network device comprises an interface configured to release over a communication link a first signal carrying a first data stream clocked by a first clock signal. The second network device comprises an interface configured to receive the first signal over the communication link. The second network device also comprises a clock extraction module configured to generate an extracted clock signal from the received first signal; and a data coding module configured to clock a second data stream with an output clock signal selected based on a speed of a locally generated clock signal relative to the first clock signal or the extracted clock signal, thereby to produce a second signal for transmission from the second network element to the first network element. By clocking the second data stream with the fastest available clock signal, greater link utilization can be achieved. Furthermore, synchronism between the first and second network elements reduces the incidence of sync slips, which permits a reduction in the size of inter-frame gaps and also affords the use of a clock frequencies exceeding the nominal rate, leading to even greater link utilization.

45 Claims, 6 Drawing Sheets

U.S. PATENT DOCUMENTS

2006/0221936 A1* 10/2006 Rauchwerk .................... 370/352
2007/0083700 A1* 4/2007 Garlepp et al. ............... 711/105
2008/0043731 A1* 2/2008 Lim et al. ...................... 370/389

OTHER PUBLICATIONS

TechFest.com, TechFest Ethernet Technical Summary, 1999, 4 pages, http://www.techfest.com/networking/lan/ethernet2.htm.

NetworkWorld.com, 10 Gigabit Ethernet, printed on Apr. 30, 2007, 6 pages, http://www.networkworld.com/details/460.html.

Silvana Rodrigues, Combining Synchronous Ethernet and IEEE-1588™ for use in Telecom, Zarlink Semiconductor, 16 pages, http://timing.zarlink.com/.

Phil Edholm and Paul Littlewood, Next-generation Ethernet: The key to infrastructure transition, Nortel Technical Journal, Issue 4, 18 pages.

Soft Mixed Signal Corporation, SMS5000 PCI-Express PIPE PHY Transceiver, 2003, 9 pages, www.softmixedsignals.com.

International Telecommunication Union, Timing and synchronization aspects in Packet Networks, ITU-T G.8261/Y.1361, May 2006, 66 pages.

* cited by examiner

METHOD AND SYSTEM FOR SYNCHRONIZATION BETWEEN NETWORK ELEMENTS

CROSS-REFERENCE TO RELATED APPLICATION

The present invention claims the benefit under 35 USC §119(e) of prior U.S. provisional patent application Ser. No. 60/915,750 to the same applicants, filed May 3, 2007, hereby incorporated by reference herein.

FIELD OF THE INVENTION

The present invention relates generally to communication between network elements and, more particularly, to methods and systems for improving the utilization of a point-to-point communication link between network elements that clock data to and from the link at high speeds.

BACKGROUND

Various protocols have been developed to allow high-speed communication between nodes of a network. One such example is Gigabit Ethernet, which is specified in IEEE 802.3-2005. In a Gigabit Ethernet network, nodes communicate with one another using frames whose individual bits are expected to be produced at a nominal rate of $10^9$ bits per second and with a line signaling rate (physical layer) of $1.25 \times 10^9$ bits per second. Therefore, the nodes of the network comprise oscillators (clocks) that are expected to operate at a nominal frequency of the signaling rate of $1.25 \times 10^9$ Hz (=1.25 GHz), although a certain tolerance is permitted, in order to facilitate the design of compliant components and reduce their cost. Specifically, the components in a node that is compliant with the IEEE 802.3-2005 standard are designed to tolerate clocks operating at a frequency within the range of +/−125 MHz (i.e., +/−100 parts-per-million (ppm)).

Because the clocks in different nodes run independently of one another, the actual frequency of a clock operating at a given node may differ slightly from one node to the next. For example, the worst-case absolute disparity in the actual frequencies of the clocks operating in two nodes compliant with the IEEE 802.3-2005 standard can be as high as 200 ppm. For high link utilization (close to 100%), the result over time of this data rate imbalance is known as a "sync slip", which is created between the data traveling in one direction and the data traveling in the opposite direction between the two nodes. Under a sustained traffic load at the data layer, such sync slips (also known as buffer underflow and overflow) will happen at regular time intervals; in fact, the higher the link utilization, and the larger the frame size, the more frequent the occurrence of sync slips per unit time. Sync slips have an impact not only on legacy data services such as fax and voice communication, but also on newer data traffic profiles such as IPTV, VoD and Circuit Emulation, as these are typically traffic profiles that can be on the order of hours and carry time-sensitive and loss-sensitive information.

To cope with sync slips, the nodes of a frame-based network (such as Gigabit Ethernet) can rely on the use of an inter-frame gap (IFG), which is effectively a digital "padding" between successive frames being transmitted over a given point-to-point link. By manipulating the size of the IFG to account for mismatches between the actual frequencies of the clocks operating in the nodes at either end of the point-to-point link, sync slips can be compensated for without impacting the integrity of the frames and, as a result, the data carried therein.

However, the use of inter-frame gaps prevents maximal exploitation of the link's capacity to carry data in a point-to-point environment. Specifically, the use of inter-frame gaps trades off part of the link capacity against the provision of a margin for handling sync slips. Further, under-exploitation of the link capacity is inevitable when the clock at one or both of the nodes communicating via the link operates at an actual frequency below the nominal frequency specified by the prevailing communication standard (albeit still within the tolerances set by the standard). In such cases, the actual throughput of point-to-point bidirectional communication will be governed by the lower of the two actual frequencies.

Thus, there is a need in the industry to improve the utilization of a point to point communication link between network elements that clock data to and from the link at high speeds.

SUMMARY OF THE INVENTION

According to a first broad aspect, the present invention may be summarized as a method of communication between a first network element and a second network element. The method comprises transmitting from the first network element to the second network element a first signal carrying a first data stream clocked by a first clock signal; generating an extracted clock signal from the first signal received from the first network element; determining a relative speed of the extracted clock signal and a second clock signal available at the second network element; and, if the extracted clock signal is determined to be faster than the second clock signal, clocking a second data stream with the extracted clock signal to produce a second signal for transmission from the second network element to the first network element.

According to a second broad aspect, the present invention may be summarized as a method of communication between a first network element and a second network element. The method comprises transmitting from the first network element to the second network element a first signal carrying a first data stream clocked by a first clock signal; generating an extracted clock signal from the first signal received from the first network element; determining a relative speed of the first clock signal and a second clock signal available at the second network element; and, if the first clock signal is determined to be faster than the second clock signal, clocking a second data stream with the extracted clock signal to produce a second signal for transmission from the second network element to the first network element.

According to a third broad aspect, the present invention may be summarized as a system for synchronizing a plurality of network devices in a network. The system comprises a first network device communicatively coupled to a communication link, and a second network device communicatively coupled to the communication link. The first network device comprises an interface configured to release over the communication link a first signal carrying a first data stream clocked by a first clock signal. The second network device comprises an interface configured to receive the first signal over the communication link. The second network device also comprises a clock extraction module configured to generate an extracted clock signal from the received first signal; and a data coding module configured to clock a second data stream with an output clock signal selected based on a speed of a locally generated clock signal relative to the first clock signal or the extracted clock signal, thereby to produce a second signal for transmission from the second network element to the first network element.

According to a fourth broad aspect, the present invention may be summarized as a network device for communication with a first network device over a communication link. The network device comprises an interface configured to receive from the first network device a downstream signal carrying a first data stream clocked by a first clock signal; a clock extraction module configured to generate an extracted clock signal from the received first signal; and a data coding module configured to clock a second data stream with an output clock signal selected based on a speed of a locally generated clock signal relative to the first clock signal or the extracted clock signal, to produce an upstream signal destined for the first network element. The interface is configured to release the upstream signal over the communication link.

According to a fifth broad aspect, the present invention may be summarized as a method of communicating between a first network element and a second network element rated as being compliant with a standard that defines a nominal frequency and a tolerance. The method comprises transmitting from the first network element to the second network element a first signal carrying a first data stream clocked by a first clock signal expressly synthesized to have a frequency different from the nominal frequency but within the tolerance; generating an extracted clock signal from the first signal received from the first network element; and clocking a second data stream with the extracted clock signal to produce a second signal for transmission from the second network element to the first network element.

According to a sixth broad aspect, the present invention may be summarized as a system for synchronizing a plurality of network devices in a network. The system comprises a communication link for transporting signals in compliance with a standard that defines a nominal frequency and a tolerance; a first network device communicatively coupled to the communication link, the first network device comprising an interface configured to release over the communication link a first signal carrying a first data stream clocked by a first clock signal expressly synthesized to have a frequency different from the nominal frequency but within the tolerance; and a second network device communicatively coupled to the communication link. The second network device comprises an interface configured to receive the first signal over the communication link; a clock extraction module configured to generate an extracted clock signal from the received first signal; and a data coding module configured to clock a second data stream with the extracted clock signal to produce a second signal for transmission from the second network element to the first network element.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION OF NON-LIMITING EMBODIMENTS

Figure 1:
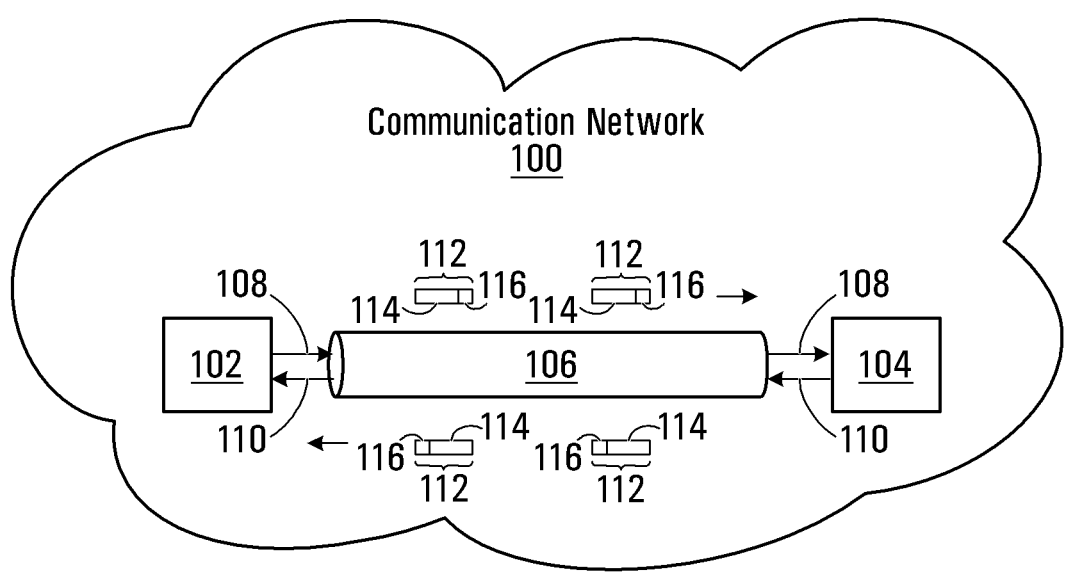
FIG. 1 is a block diagram of a portion of a communication network that comprises a first network element and a second network element.

With reference to FIG. 1, there is shown in block diagram form a portion of a communication network 100 that comprises a plurality of network elements including a first network element 102 and a second network element 104. The first network element 102 is connected to the second network element 104 by a communication link 106 which may in actual practice traverse a set of one or more physical segments as well as one or more regions of one or more networks. The first and second network elements 102, 104 may be connected to other network elements of the communication network 100, which have been omitted from the drawing for simplicity.

The network elements of the communication network 100, including the first and second network elements 102, 104, can be arranged in any of a variety of network topologies, including a hub-and-spoke network, a ring network and a mesh network, to name a few non-limiting possibilities. Non-limiting examples of the communication network 100 include a LAN (such as an Ethernet network), a SAN (such as a Fiber Channel network), an IP network (such as the Internet), Optical Ethernet networks, Gigabit Ethernet networks and Frame Relay, to name a few non-limiting possibilities.

Non-limiting examples of the first and second network elements 102, 104 include any of a variety of network devices implemented in communications networks, such as bridges, routers, switches, repeaters, hubs, access concentrators, storage switches, optical network terminations, optical line terminations, multiplexers, modems (e.g., dial-up, cable or digital subscriber line modems), as well as desktop computers, notebook computers, digital personal assistants and wireless telephones, to name a few non-limiting possibilities.

Non-limiting examples of the communication link 106 include a wireline medium, a fiber optical medium, a free-space optical medium and a wireless medium, to name a few non-limiting possibilities. The communication link 106, when bidirectional, is made up of a pair of unidirectional communication paths, referred to herein as a first communication path 108 and a second communication path 110. The first communication path 108 carries data output by the first network element 102 towards the second network element 104, while the second communication path 110 carries data output by the second network element 104 towards the first network element 102. The first and second communication paths 108, 110 may, but need not, be physically distinct. For example, in the case where the communication link 106 includes an optical medium, the first and second communication paths 108, 110 may correspond to different wavelengths or groups of wavelengths in the spectrum of wavelengths that can be transported by such medium.

The first network element 102 sends data to the second network element 104 over the first communication path 108 in the form of frames 112, each having a payload 114 containing application data and a header 116. Similarly, the second network element 104 sends data to the first network element 102 over the second communication path 110 in the form of frames 112, each having a payload 114 containing application data and a header 116. A frame can be viewed as a collection of bits divided into a payload containing application data of a certain type as well as a header (which may comprise a leading portion and/or a trailing portion and/or one or more intermediate portions) containing control information that can assist in processing the payload. For example, the control information may delineate the payload and/or indicate the type of application data carried by the payload. Frames can alternatively be referred to as packets or datagrams, among other equivalents.

In asynchronous networks, the precise points in time where a given frame begins and ends is not subject to strict regulations as they are in synchronous networks. As a result, the exact locations of the bits in successive frames transmitted by, say, the first network element 102, are not predictable by, say, the second network element 104 when it is receiving such frames from the first network element 102. The same is true in the opposite direction of communication. A network element that transmits frames to its neighbor will therefore encode a clock signal into the low-level physical layer representation of the bits transported by those frames.

This can be done by line coding or other techniques, which guarantee that sufficient signal level transitions will occur to allow a clock signal to be recovered by the recipient and used for decoding the data in each frame.

In the present embodiment, it is assumed that bidirectional communication is to be established between the first network element 102 and the second network element 104 over the communication link 106. Moreover, reference will be made to a "master" node and a "slave" node. By "master" node is meant a network element having access to a source clock (external or self-generated) that governs a clocking scheme adopted by both the master and slave nodes; in contrast, by "slave" node is meant a network element which, although it may have a source clock, does not have control over the clocking scheme it is to use, as it relies on a clock signal received or retrieved from the master node to establish the communication. In the description to follow, the first network element 102 is chosen as the "master" node and the second network element 104 is chosen as the "slave" node, although the reverse could have been true without departing from the scope of the invention.

Figure 2A:
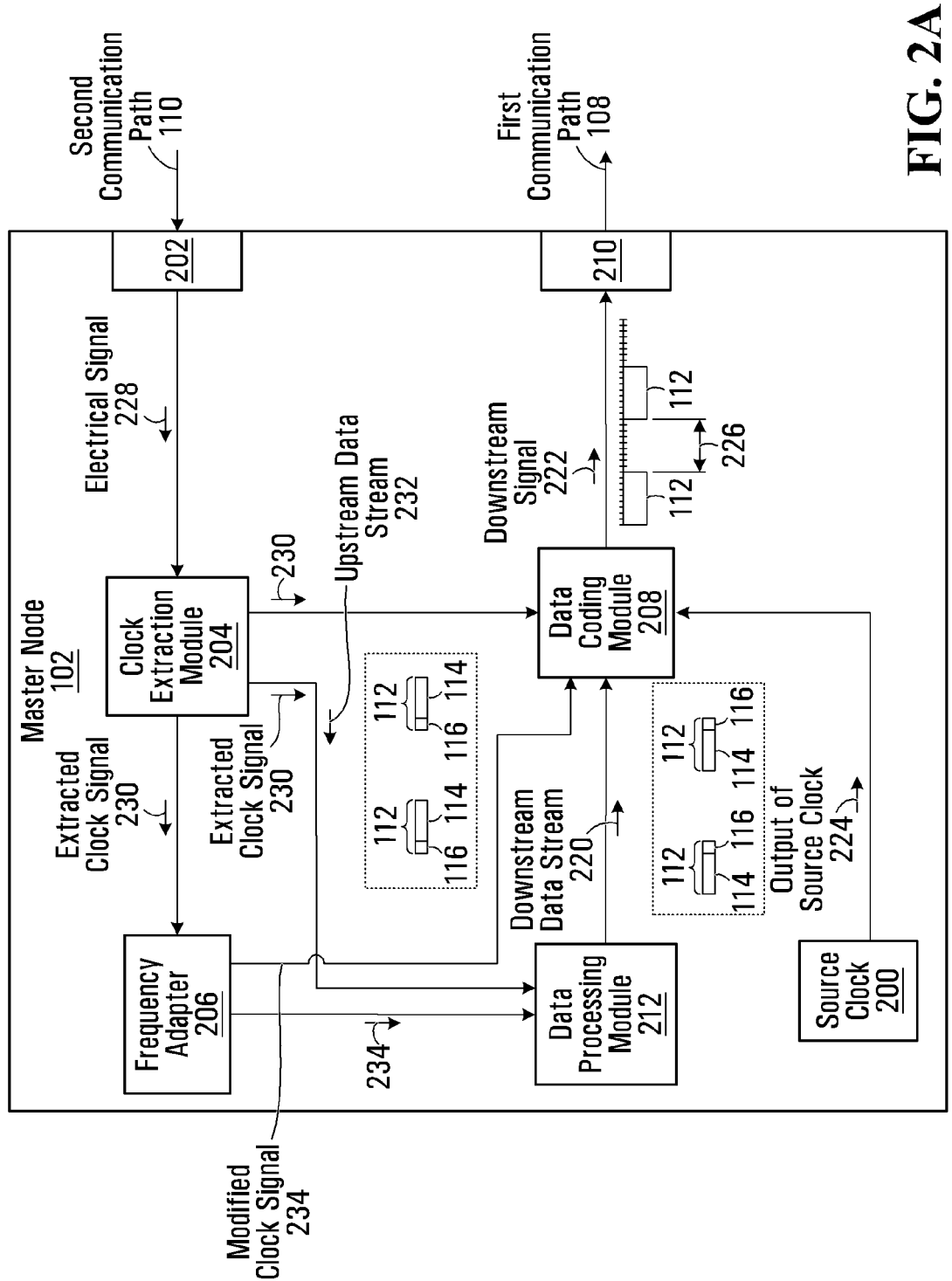
FIG. 2A is a block diagram of certain elements of the first network element, in accordance with a non-limiting embodiment of the present invention.

The transmittal, receipt and processing of frames by the first and second network elements 102, 104 is effected by a collection of internal circuitry, some components of which will now be described. Other components required for proper operation of the first or second network element 102, 104 will be well understood by those of skill in the art, and therefore such components are not described here. Turning therefore to FIG. 2A, there is shown an internal block diagram of certain elements of the first network element 102 in accordance with a non-limiting embodiment of the present invention.

It is recalled that in the specific non-limiting embodiment being considered at present, the first network element 102 is the master node. The first network element 102 therefore includes a receive interface 202, a clock extraction module 204, a data coding module 208, a transmit interface 210, a data processing module 212 and a frequency adapter 206, which is optional. Moreover, because it is a master node, the first network element 102 comprises a source clock 200, which can be selected from a plurality of source clocks.

The data processing module 212 provides a downstream data stream 220 for transmission to the second network element 104 over the first communication path 108. The downstream data stream 220 is made up of frames 112, each having a payload 114 containing application data and a header 116. The application data may originate from another network element further upstream from the first network element 102, or it may originate at the first network element 102 itself, for example from an application (such as a VoIP software application, etc.) being executed by or at the first network element 102.

The downstream data stream 220 is provided to the data coding module 208. The data coding module 208 has the responsibility of encoding the downstream data stream 220 in accordance with, e.g., a line code that embeds a clock signal. The output of the data coding module 208 is a downstream signal 222 that is placed onto the first communication path 108 by the transmit interface 210. The downstream signal 222 may be converted into optical or wireless form by the transmit interface 210, depending on the nature of the first communication path 108.

The data coding module 208 is clocked by an output 224 of the source clock 200 running at an actual frequency, or by a modified clock signal 234 output by the frequency adapter 206. By way of non-limiting illustration, the source clock 200 may be a free-running crystal oscillator or any other type of clock. In an embodiment where the first network element 102 is rated as being compliant with a standard that defines a nominal frequency and a tolerance, the actual frequency of the source clock 200 does not have to be precisely at the nominal frequency but rather can fall somewhere within the tolerance; the actual frequency of the source clock 200 may even vary over time and with factors such as temperature and aging, but will remain within the tolerance of the standard since the first network element 102 is rated as being compliant with the standard. Thus, the source clock 200 may in fact have its own tolerance, which must be strict enough to prevent the actual frequency of the source clock 200 from falling outside the tolerance of the standard with which the first network element 102 is rated as being compliant. Of course, this does not preclude the source clock 200 being characterized by a stricter tolerance than necessary and thus the source clock 200 may even be a stratum 1 clock, which is considered in the art as being of the highest quality.

Also depending on the standard with which the first network element 102 is rated as being compliant, the data coding module 208 (or the data processing module 212) may also ensure that successive frames being encoded and sent over the first communication path 108 via the transmit interface 210 are separated by a suitable inter-frame gap 226. For example, the IEEE 802.3-2005 standard requires the presence of a nominal inter-frame gap of ninety-six (96) bit times between successive frames and a minimum inter-frame gap of sixty-four (64) bit times. This usually ensures that if there is a disparity between the actual frequency of the source clock 200 and the actual frequency of a clock used by a downstream network element, there would not result a buffer underflow or overflow at that downstream network element. Although it is within the scope of the present invention for the data coding module 208 (or the data processing module 212) to continue to abide by such a principle and ensure the existence of a minimum inter-frame gap 226 between successive frames 112, it will be seen later on that the need for an inter-frame gap 226 may be reduced or eliminated, and in such cases the appropriate modifications can be made to the data coding module 208 (or the data processing module 212).

In the reverse direction of communication, the first network element 102 seeks to retrieve data that has been transmitted by the second network element 104. To this end, the first network element 102 is configured to receive an upstream signal over the second communication path 110 via the receive interface 202. The upstream signal may be in electrical, optical or wireless form. If it is in optical or wireless form, it may be converted by the receive interface 202 into an electrical signal 228 before being fed to the clock extraction module 204. The electrical signal 228 fed to the clock extraction module 204 contains transitions that encode frames carrying application data from the second network element 104 as well as a clock signal.

The clock extraction module 204 processes the signal 228 received from the receive interface 202 in order to generate an extracted clock signal 230 and to create an upstream data stream 232 which includes frames 112 transmitted by the second network element 104. It should be appreciated that in some embodiments, the clock extraction module 204 may be integrated with the receive interface 202, and in such embodiments the integrated module can produce the extracted clock signal 230 and the upstream data stream 232 directly from the upstream signal without converting it into an electrical signal.

Inter-frame gaps 226 that may be present in the upstream signal can be ignored by the clock extraction module 204 when creating the upstream data stream 232; alternatively they can appear in the upstream data stream 232. The upstream data stream 232 is provided to the data processing module 212, while the extracted clock signal 230 can be provided to the data processing module 212 and/or to the frequency adapter 206.

In a non-limiting embodiment, the frequency adapter 206 may comprise a phase-locked loop (PLL) or other circuit adapted to implement a frequency multiplier or frequency divider, which outputs the aforesaid modified clock signal 234 for use by the data processing module 212. In other embodiments, the frequency adapter 206 is not required, and the extracted clock signal 230 could be provided directly to the data processing module 212.

The data processing module 212 processes the upstream data stream 232 to identify the frames 112 carried therein, and to retrieve the payload 114 contained in each frame 112. In a non-limiting embodiment, the data processing module 212 can implement one or more layers of one or more network protocol stacks and can be adapted to prepare the payload 114 and/or the header 116 for further processing, such as by buffering, de-encapsulating/re-encapsulating, performing error checks, modifying packet/frame headers, and the like.

In one example of further processing of the payload 114 of a given upstream frame 112, the first network element 102 comprises multiple transmit and receive interfaces similar to the transmit interface 210 and the receive interface 202, which allow the first network element 102 to be connected to a plurality of other network elements including the second network element 104. Based on switching instructions, which may be explicitly or implicitly encoded in the payload 114 or the header 116 of the given upstream frame 112, the data processing module 212 may conclude that the payload 114 is to be sent to a particular one of the other network elements to which the first network element 102 is connected. Accordingly, the header 116 of the given upstream frame 112 would be modified to indicate that the frame 112 is now destined for the particular network element, and the resulting frame would be output by the data processing module 212 to a data coding module (which may be the data coding module 208) connected to the transmit interface leading to the particular destination network element.

In another example of further processing, the first network element 102 could include a networked notebook computer operating a VoIP software application. Accordingly, as frames 112 containing sampled voice data in their payloads 114 are received from the second network element 104, the data processing module 212 could be adapted to de-encapsulate the frames 112 using an IP network protocol stack to obtain the sampled voice data in the payloads 114 of the frames 112. The sampled voice data then may be provided to the VoIP software application, which uses the signal 234 output by the frequency adapter 206 to determine the appropriate instants at which to provide the sampled voice data for audible output via a speaker of the notebook computer.

It will be recognized that various other forms of further processing may be performed by the first network element 102 in various embodiments.

Figure 2B:
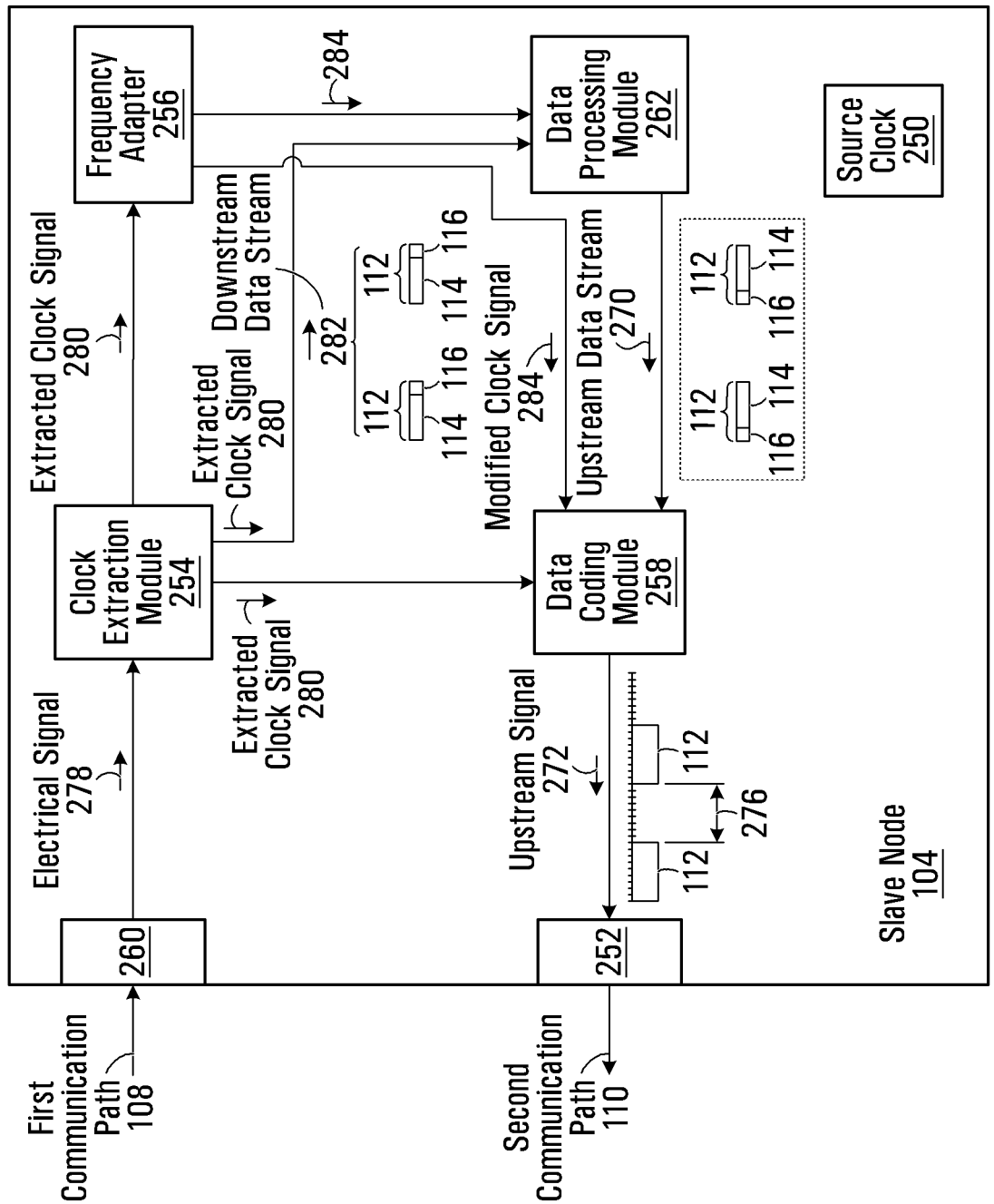
FIG. 2B is a block diagram of certain elements of the second network element, in accordance with a non-limiting embodiment of the present invention.

Turning now to FIG. 2B, there is shown an internal block diagram of certain elements of the second network element 104 in accordance with a non-limiting embodiment of the present invention. The illustrated second network element 104 includes a receive interface 260, a clock extraction module 254, an optional frequency adapter 256, a data coding module 258, a transmit interface 252 and a data processing module 262. Because it is a slave node, the second network element 104 does not have to comprise a source clock 250, but such may be provided to allow the second network element 104 to play the role of the master node in an alternative embodiment.

In one direction of communication, the second network element 104 seeks to retrieve data that has been transmitted by the first network element 102. To this end, the second network element 104 is configured to receive a downstream signal over the first communication path 108 via the receive interface 260. The downstream signal may be in electrical, optical or wireless form.

If it is in optical or wireless form, it may be converted into an electrical signal 278 before being fed to the clock extraction module 254. The electrical signal 278 fed to the clock extraction module 254 contains transitions that encode frames carrying application data from the first network element 102 as well as a clock signal which, it is recalled, was embedded by the data coding module 208 in the first network element 102 and corresponds to the output of the source clock 200.

The clock extraction module 254 processes the signal 278 received from the receive interface 260 in order to generate an extracted clock signal 280 and to create a downstream data stream 282 which includes the frames 112 transmitted by the first network element. It should be appreciated that in some embodiments, the clock extraction module 254 may be integrated with the receive interface 260, and in such embodiments the integrated module can produce the extracted clock signal 280 and the downstream data stream 282 directly from the downstream signal without converting it into an electrical signal.

Inter-frame gaps 226 that may be present in the downstream signal can be ignored by the clock extraction module 254 when creating the downstream data stream 282; alternatively they can appear in the downstream data stream 282. The downstream data stream 282 is provided to the data processing module 262, while the extracted clock signal 280 can be provided to the data coding module 258, as well as to the data processing module 262 and/or to the frequency adapter 256.

In a non-limiting embodiment, the frequency adapter 256 may comprise a phase-locked loop (PLL) or other circuit adapted to implement a frequency multiplier or frequency divider, which outputs a modified clock signal 284 for use by the data processing module 262. In other embodiments, the frequency adapter 256 is not required, and the extracted clock signal 280 could be provided directly to the data processing module 262.

The data processing module 262 processes the downstream data stream 282 to identify the frames 112 carried therein, and to retrieve the payload 114 contained in each frame 112. In a non-limiting embodiment, the data processing module 262 can implement one or more layers of one or more network protocol stacks and can be adapted to prepare the payload 114 for further processing, such as by buffering, de-encapsulating/re-encapsulating, performing error checks, modifying packet/frame headers, and the like.

In one example of further processing of the payload 114 of a given downstream frame 112, the second network element 104 comprises multiple transmit and receive interfaces similar to the transmit interface 252 and the receive interface 260, which allow the second network element 104 to be connected to a plurality of other network elements including the first network element 102. Based on switching instructions, which may be explicitly or implicitly encoded in the payload 114 or the header 116 of the given downstream frame 112, the data processing module 262 may conclude that the payload 114 is to be sent to a particular one of the other network elements to which the second network element 104 is connected. Accordingly, the header 116 of the given downstream frame 112 would be modified to indicate that the frame 112 is now destined for the particular network element, and the resulting frame would be output by the data processing module 262 to a data coding module (which may be the data coding module 258) connected to the transmit interface leading to the particular destination network element.

In another example of further processing, the second network element 104 could include a networked notebook computer operating a VoIP software application. Accordingly, as frames 112 containing sampled voice data in their payloads 114 are received from the first network element 102, the data processing module 262 could be adapted to de-encapsulate the frames 112 using an IP network protocol stack to obtain the sampled voice data in the payloads 114 of the frames 112. The sampled voice data then may be provided to the VoIP software application, which uses the signal output by the frequency adapter 256 to determine the appropriate instants at which to provide the sampled voice data for audible output via a speaker of the notebook computer.

It will be recognized that various other forms of further processing may be performed by the second network element 104 in various embodiments.

Recalling that in the present embodiment, one seeks to establish bidirectional communication between the first network element 102 and the second network element 104 over the communication link 106, the data processing module 262 also provides an upstream data stream 270 for transmission to the first network element 102. The upstream data stream 270 is made up of frames 112, each having a payload 114 containing application data and a header 116. The application data may originate from another network element further downstream from the second network element 104, or it may originate at the second network element 104 itself, for example from an application (such as a VoIP software application, etc.) being executed by or at the second network element 104.

The upstream data stream 270 is provided to the data coding module 258. The data coding module 258 has the responsibility of encoding the upstream data stream 270 in accordance with, e.g., a line code that embeds a clock signal. While the source clock 250 may be provided, the data coding module 258 is not clocked by the source clock 250, but rather by the extracted clock signal 280 output by the clock extraction module 254, or by the modified clock signal 284 output by the frequency adapter 256.

The output of the data coding module 258 is an upstream signal 272 that is placed onto the second communication path 110 by the transmit interface 252. The upstream signal 272 may be converted into optical or wireless form by the transmit interface 252, depending on the nature of the second communication path 110.

The data coding module 258 (or the data processing module 262) may also ensure that successive frames being encoded and sent over the second communication path 110 via the transmit interface 252 are separated by a suitable inter-frame gap 276.

It will be appreciated that because the frequency of the extracted clock signal 280 at the second network element 104 will be the same as the actual frequency of the source clock 200 in the first network element 102, the rate at which data is clocked along the first communication path 108 will correspond to the rate at which data is clocked along the second communication path 110. This reduces the frequency and magnitude of sync slips that may arise at the first and second network elements 102, 104 when bidirectional communication is to be established with high link utilization requirements in either direction of communication, such as during a telephone call or during a burst mode of transmission.

As mentioned previously, the standard with which the first and second network elements 102, 104 are rated as being compliant may call for the presence of an inter-frame gap 226 between successive frames 112 being transmitted over the first or second communication paths 108, 110. However, recognizing that the usefulness of inter-frame gaps 226 is in mitigating the effect of sync slips, and further recognizing that sync slips would be rendered less prevalent by the technique described above where the clock signal used by the second network element 104 to send frames 112 to the first network element 102 is synchronized to the clock signal used by the first network element 102 to send frames 112 to the second network element 104, one can now contemplate reducing the size of the inter-frame gaps 226 to below the minimum recommended size. In fact, it is contemplated that the use of an inter-frame gap (such as the inter-frame gap 226) can be entirely eliminated during sustained high link utilization period of during short burst transmission, since there is no practical need to account for sync slips that are not expected to occur. The net effect is an increase in the utilization of the capacity of the communication link 106 in both directions of communication.

It will be noted that although the above description has designated the first network element 102 as the master node and the second network element 104 as the slave node, specific attention was not paid to the actual frequency of the source clock 200. Because of the random nature of the actual frequency of the source clock 200 (which is somewhere within a certain tolerance of a certain nominal rate), if the master node is selected at random as either the first network element 102 or the second network element 104 (assuming both to be equipped with a source clock), then it is likely that a certain percentage of the time the actual frequency of the source clock 200 would be lower than the actual frequency of the source clock 250, and thus one would have been better off choosing the second network element 104 as the master node and the first network element 102 as the slave node in order to achieve faster data transmission.

Accordingly, it is within the scope of the present invention for the first and second network elements 102, 104 to measure the actual frequencies of each other's (or their own) source clocks and to participate in a handshaking procedure resulting in the selection of the master node as the network element having the source clock with the higher actual frequency. As an initial condition of the handshaking procedure, the data coding modules 208, 258 in the first and second network elements 102, 104, respectively, are set to be clocked by their respective source clocks 200, 250 and not by any extracted clock signal.

Figure 3:
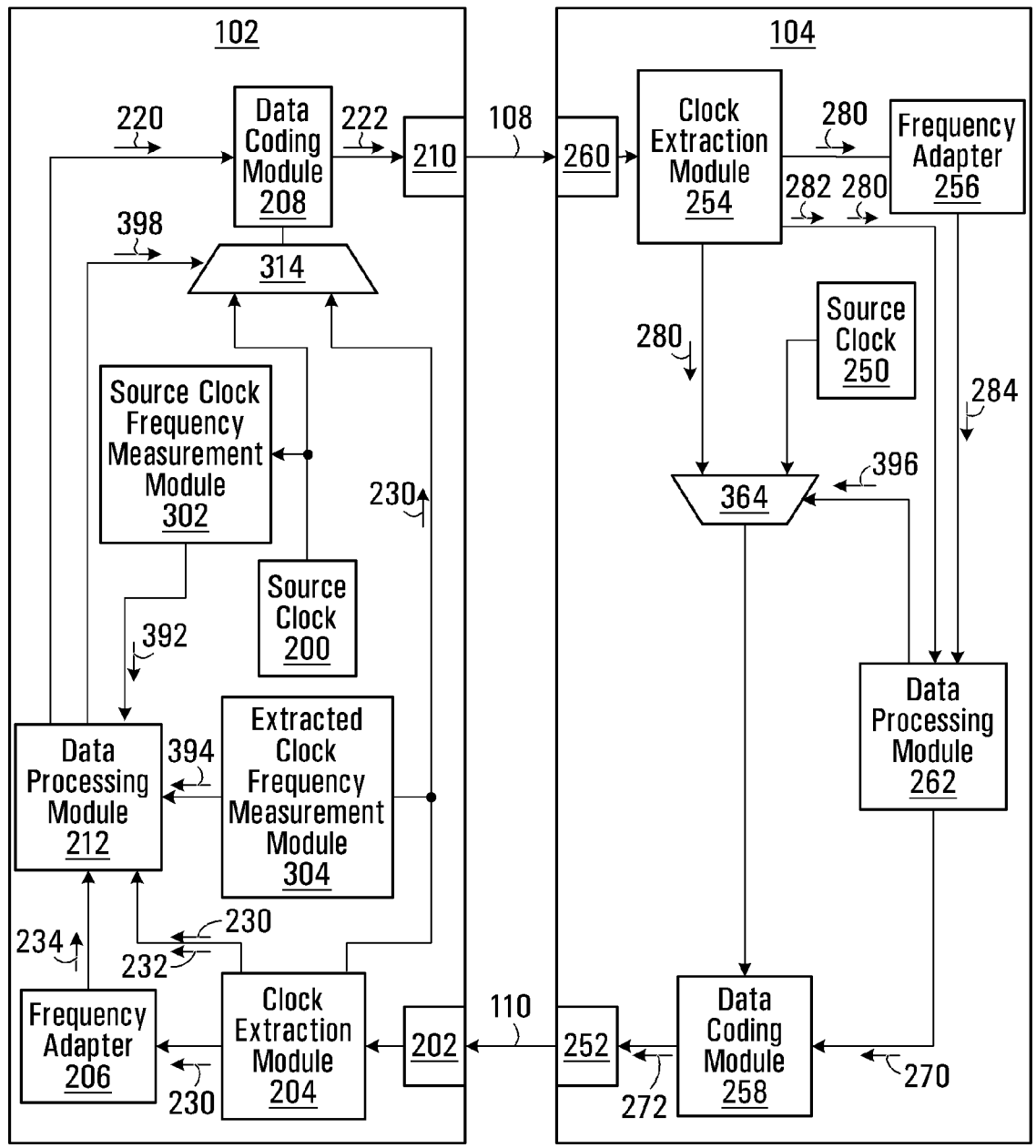
FIG. 3 is a block diagram of the first and second network elements adapted to participate in a handshaking procedure to exchange clock frequency measurement information, in accordance with a non-limiting embodiment of the present invention.

With reference to FIG. 3, which is a variant of FIGS. 2A and 2B adapted to implement the handshaking procedure, a multiplexer 314, 364 may be provided in each of the first and second network elements 102, 104 for the purpose of allowing the respective data coding module 208, 258 to be selectively clocked by either the source clock 200, 250 or the locally extracted clock signal or from another external clock source common to both network elements 102, 104. Each multiplexer 314, 364 can be controlled by the respective data processing module 212, 262 which can execute computer-readable instructions during the handshaking procedure.

With continued reference to FIG. 3, the first network element 102 is equipped with a source clock frequency measurement module 302 that receives the output of the source clock 200. The source clock frequency measurement module 302 is configured to measure the actual frequency of the source clock 200 and to provide these results 392 to the data processing module 212 based on a precise external clock source or a calibrated clock source. In addition, the first network element 102 is equipped with an extracted clock frequency measurement module 304 that receives the extracted clock signal 230 from the clock extraction module 204. The extracted clock frequency measurement module 304 is configured to measure the frequency of the extracted clock signal 230 and to provide these results 394 to the data processing module 212.

The data processing module 212 comprises suitable circuitry, software and/or control logic for interpreting the results 392, 394 received from the source clock frequency measurement module 302 and the extracted clock frequency measurement module 304 and to make a determination about the relative speed of the clock signals output by the two source clocks. These two clock frequency measurement modules (302 and 304) could be implemented as a single entity or as separate modules. If the outcome of this determination is that the source clock 200 is running faster than the source clock 250, then the data processing module 212 can complete the handshaking procedure by sending an instruction to the second network element 104 to cause the data coding module 258 to be clocked by the extracted clock signal 280, whose frequency will correspond to the (faster) actual frequency of the source clock 200. This effectively transforms the second network element 104 into the slave node, rendering the first network element 102 the master node.

It should be appreciated that the data processing module 212 may make the determination about which clock is running faster in other ways, such as by consulting a table or other memory element that stores the frequencies of various clock signals, including the frequency of the signal output by the source clock 200 and the frequency of the signal output by the source clock 250. Such a memory element could be stored in a central location on the network 100, or it could be distributed periodically to the various network elements, including to the first and second network elements 102, 104.

The aforesaid instruction can be sent in the form of a downstream frame transmitted over the first communication path 108, in which case the data processing module 262 should be modified to recognize such an instruction. Alternatively, the instruction can be sent over an independent control path (not shown) existing between the first and second network elements 102, 104. Upon receipt of the instruction, the data processing module 262 sends a control signal 396 to the multiplexer 364, instructing it to select as its output, the input coming from the clock extraction module 254 (i.e., the extracted clock signal 280).

On the other hand, if the outcome of the determination made by the data processing module 212 is that the source clock 200 is running slower than the source clock 250, then the data processing module 212 can refrain from sending any instruction to the second network element 104, but instead sends a control signal 398 to the multiplexer 314, instructing it to select as its output, the input coming from the clock extraction module 204 (i.e., the extracted clock signal 230). This causes the data coding module 208 in the first network element 102 to be clocked by the extracted clock signal 230, which will have a frequency that corresponds to the (faster) actual frequency of the source clock 250 in the second network element 104. This effectively transforms the first network element 102 into the slave node, while the second network element 104 becomes the master node.

Figure 4:
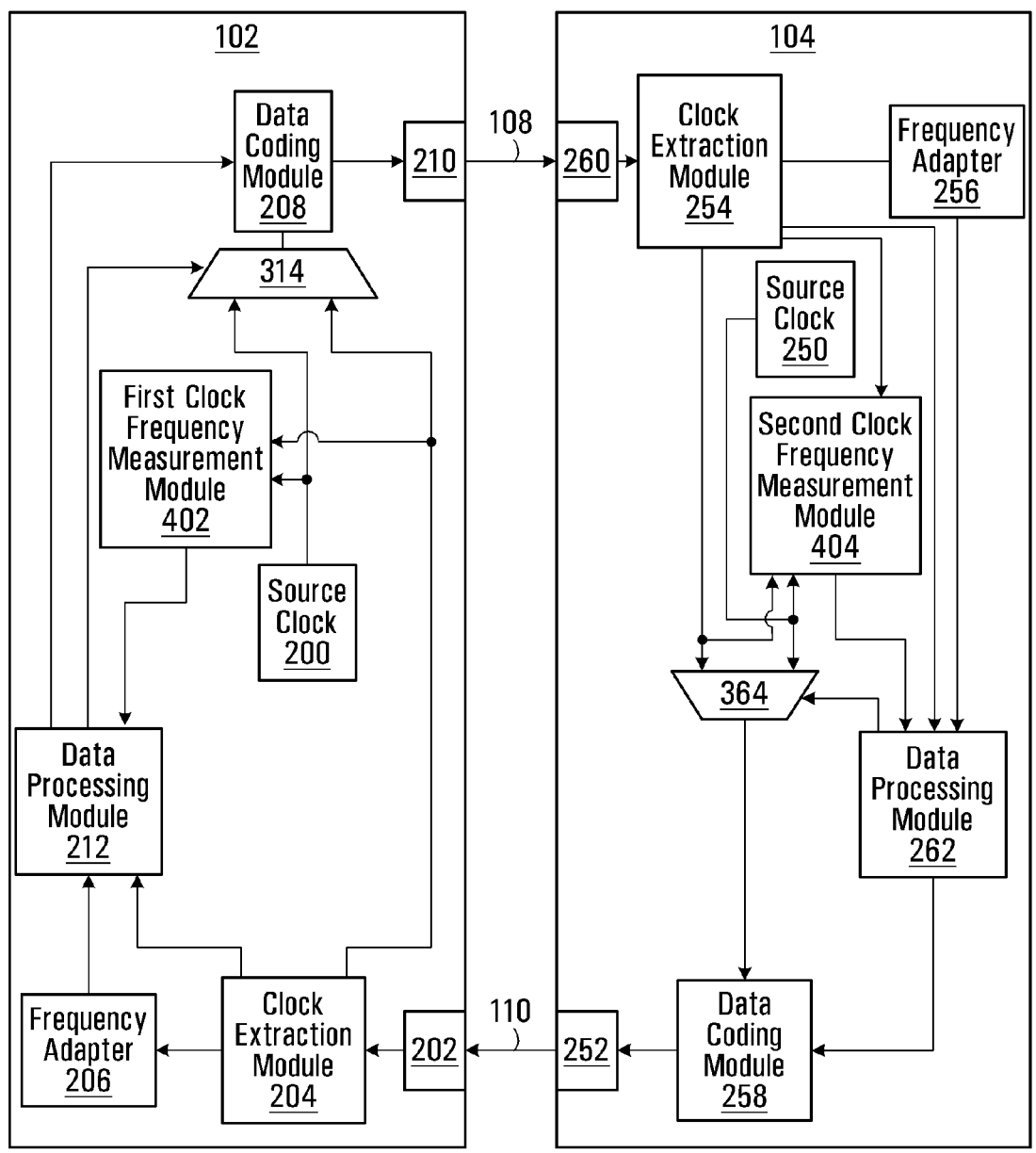
FIG. 4 is a variant of FIG. 3, in accordance with a non-limiting embodiment of the present invention.

In other embodiments, the functionality of the source clock frequency measurement module 302 and the extracted clock frequency measurement module 304, as well as the added functionality of the data processing module 212 and the data processing module 262 for implementing the handshaking procedure, can take on a more distributed nature. In other words, and as shown in FIG. 4 for example, the source clock frequency measurement module 302 and the extracted clock frequency measurement module 304 in the first network element 102 (shown in FIG. 3) can be replaced by a first clock frequency measurement module 402 in the first network element 102 and by a second clock frequency measurement module 404 in the second network element 104. In this case, each of the first and second network elements 102, 104 measures the actual frequency of its own source clock against the extracted clock signal, and either or both network elements can submit their results to the other network element. A similar decision making process to the one described above is then conducted in either or both of the data processing modules 212, 262, noting that when the process is conducted in both of the data processing modules 212, 262, the outcome will be the same. Hence, to avoid duplication, it is within the scope of the present invention for a selected one of the network elements 102, 104, i.e., either the first network element 102 or the second network element 104, to exclusively conduct the decision making process about which network element will be the master node and which will be the slave node.

It will thus be apparent that utilization of the capacity of the communication link 106 is further increased by the above techniques whereby the faster of the two source clocks 200, 250 in the first and second network elements 102, 104 is selected as the governing clock rate for bidirectional traffic.

To gain a better appreciation of the increase in utilization of the capacity of the communication link 106 resulting from the various non-limiting embodiments described above, reference is made to the following Table 1, in which the rows correspond to different example scenarios under the assumption that the source clock 200 operates at an actual frequency of (1.25 GHz-100 ppm) and the source clock 250 operates at an actual frequency of (1.25 GHz-50 ppm). All of the scenarios assume a payload of 64 bytes per frame. Columns 2 and 3 show the frequency used by the data coding modules 208, 258 to clock data, while columns 4 and 5 show the effective data rate (i.e., payload bytes per second) over the first and second communication paths 108, 110, respectively, for 100% link utilization.

TABLE 1

| | Frequency used by data coding module 208 | Frequency used by data coding module 258 | Sustained effective data rate of $1^{st}$ comm. path | Sustained effective data rate of $2^{nd}$ comm. path |
|---|---|---|---|---|
| 1. Conventional | 1.25 GHz −100 ppm | 1.25 GHz −50 ppm | 761.8286 Mb/s | 761.8667 Mb/s |
| 2. Handshake | 1.25 GHz −50 ppm | 1.25 GHz −50 ppm | 761.8667 Mb/s | 761.8667 Mb/s |
| 3. 8-byte IFG | 1.25 GHz −50 ppm | 1.25 GHz −50 ppm | 799.9600 Mb/s | 799.9600 Mb/s |
| 4. No IFG | 1.25 GHz −50 ppm | 1.25 GHz −50 ppm | 888.8444 Mb/s | 888.8444 Mb/s |

Note:
the nominal data rate (100% link utilization with nominal-size inter-frame gap) for 64-byte-packet Gigabit Ethernet is 761.9048 Mb/s Specifically, row 1 corresponds to a conventional asynchronous scenario where there is no master/slave configuration, i.e., each of the first and second network elements 102, 104 utilizes its own source clock to clock the frames 112 being sent to the other network element. Additionally, this scenario assumes the standard practice of inserting an inter-frame gap 226 having a nominal size of 96 bit-lengths between successive frames 112 in order to compensate for sync slips due to the mismatch between the actual frequency of the source clock 200 and the actual frequency of the source clock 250.

Row 2 corresponds to a non-limiting embodiment of the present invention where the faster of the two source clocks 200, 250 has been selected through a handshaking procedure as described above with reference to FIGS. 3 and 4. Additionally, this scenario continues to assume the standard practice of inserting an inter-frame gap 226 having a nominal size of 96 bit-lengths between successive frames 112. In this non-limiting example, it will be seen that the effective data rate that can be sustained over the first communication path 108 has been increased by 38.1 kbps (when compared to the example conventional case above).

Similarly to row 2, row 3 corresponds to a non-limiting embodiment of the present invention where the faster of the two source clocks 200, 250 has been selected through the handshaking procedure. In addition, in the scenario of row 3, the inter-frame gap 226 has been reduced to the minimum 64 bit-lengths between successive frames 112. In this non-limiting example, it will be seen that the effective data rate that can be sustained over the first communication path 108 has been increased by 38.1314 Mbps, and the effective data rate that can be sustained over the second communication path 110 has been increased by 38.0933 Mbps (when compared to the example conventional case above) or by 38.1314 Mbps (when compared to the worst case conventional case).

Similarly to rows 2 and 3, row 4 corresponds to a non-limiting embodiment of the present invention where the faster of the two source clocks 200, 250 has been selected through the handshaking procedure. In addition, in the scenario of row 4, the inter-frame gap 226 has been entirely eliminated. In this non-limiting example, it will be seen that the effective data rate that can be sustained over the first communication path 108 has been increased by 127.0158 Mbps, and the effective data rate that can be sustained over the second communication path 110 has been increased by 126.9777 Mbps (when compared to the example conventional case above) or by 127.0158 Mbps (when compared to the worst case conventional case).

It will be observed that in the conventional asynchronous scenario of row 1, the effective data rate is governed by the source clock having the slower actual frequency. For the scenarios of each of the other rows (2, 3 and 4), there is clearly an increase in the sustained effective data rate that can be achieved.

It has thus been shown that when two network elements have clocks that are suspected of running at different actual frequencies, the link capacity can be maximally utilized by identifying the one with the higher actual frequency and making it a master node, and allowing the other network element to synchronize itself with the master node. Moreover, inter-frame gaps no longer have the same usefulness and indeed by reducing their size or eliminating them during a high link utilization period, utilization of the capacity of the communication link can be increased. Moreover, it should be apparent that the size of the payload can now be made arbitrarily large and to go even beyond the limits imposed by the standard with which the network elements are rated as being compliant. This is made possible because of the absence of the need to account for sync slips, whose occurrence will be significantly reduced once the second network element uses the clock derived from the first network element to clock frames of data to the first network element (or vice versa). As was shown, the result can be a higher effective data rate.

Additionally, the lack of sync slips also means that one can reduce the memory requirements of the data processing modules 212, 262, which would previously have been sized in order to account for sync slips. This presents a step in the direction of buffer less asynchronous systems, which are particularly attractive in delay-sensitive applications such as streaming media.

It should be mentioned that if it is known in advance which of the first and second network elements 102, 104 will be the master node and which will be the slave node, then it is possible to equip the master node and the slave node with the specific circuitry and components required to implement their respective functions. However, if the first network element 102 could have been the master node just as easily as it could be the slave node, then it should be understood that the first network element 102 (and likewise the second network element 104) should be equipped with the circuitry and components required to implement both the functionality of the master node and the functionality of the slave node, in order to be prepared to execute either role when called for.

Also, persons skilled in the art will appreciate that although the above embodiments have dealt with a single master and a single slave, environments where there are three or more network elements may call for certain network elements acting as a slave node relative to one network element and as a master node relative to another network element. More specifically, for example, where the first network element 102 was described as being the master node (relative to the second network element 104, which was the slave node) in some of the above embodiments, it is possible that the first network element 102 may have actually been the slave node relative to some other network element. In this case, both the first network element 102 and the second network element 104 could be characterized as slave nodes relative to such other network element. Other configurations are of course possible and are within the scope of what has been contemplated, as are their variants which would be apparent to those of ordinary skill in the art.

It will further be appreciated that the link capacity utilization improvement obtained using the embodiments described above can be amplified when at least one of the network elements is equipped with, or has access to, a clock signal designed to be within a very strict tolerance, e.g., on order of 10 ppm, 5 ppm or even 1 ppm. Clock signals with this level of precision can be generated by atomic-level oscillators (e.g., based on the element cesium) or can be obtained from global positioning system (GPS) satellites. When clock signals with such accuracy are used in a network having a tolerance of 100 ppm, one can exploit the difference in tolerances to achieve further increased performance.

For example, for Gigabit Ethernet as specified in the IEEE 802.3-2005 standard, the nominal line encoding frequency is 1.25 GHz with a tolerance of +/−100 ppm, which means that all equipment is designed to function at a frequency ranging from 1.249875 GHz to 1.250125 GHz. Assume now that an available source clock has an unknown actual frequency but is specified to have a nominal frequency of 1.25 GHz with a tolerance of +/−10 ppm. In this case, one can consider that such a clock has an overly high degree of precision for the application being contemplated. However, one can also realize that by accelerating the frequency of the clock signal by 89 ppm, then the frequency of the resultant signal has an upper bound of (1.2500125 GHz+89 ppm)=1.2501237511175 GHz. The key observation is that this upper bound is less than 1.250125 GHz, and therefore the accelerated clock signal is guaranteed to meet the tolerances of the standard with which the network elements are rated as being compliant.

Figure 5:
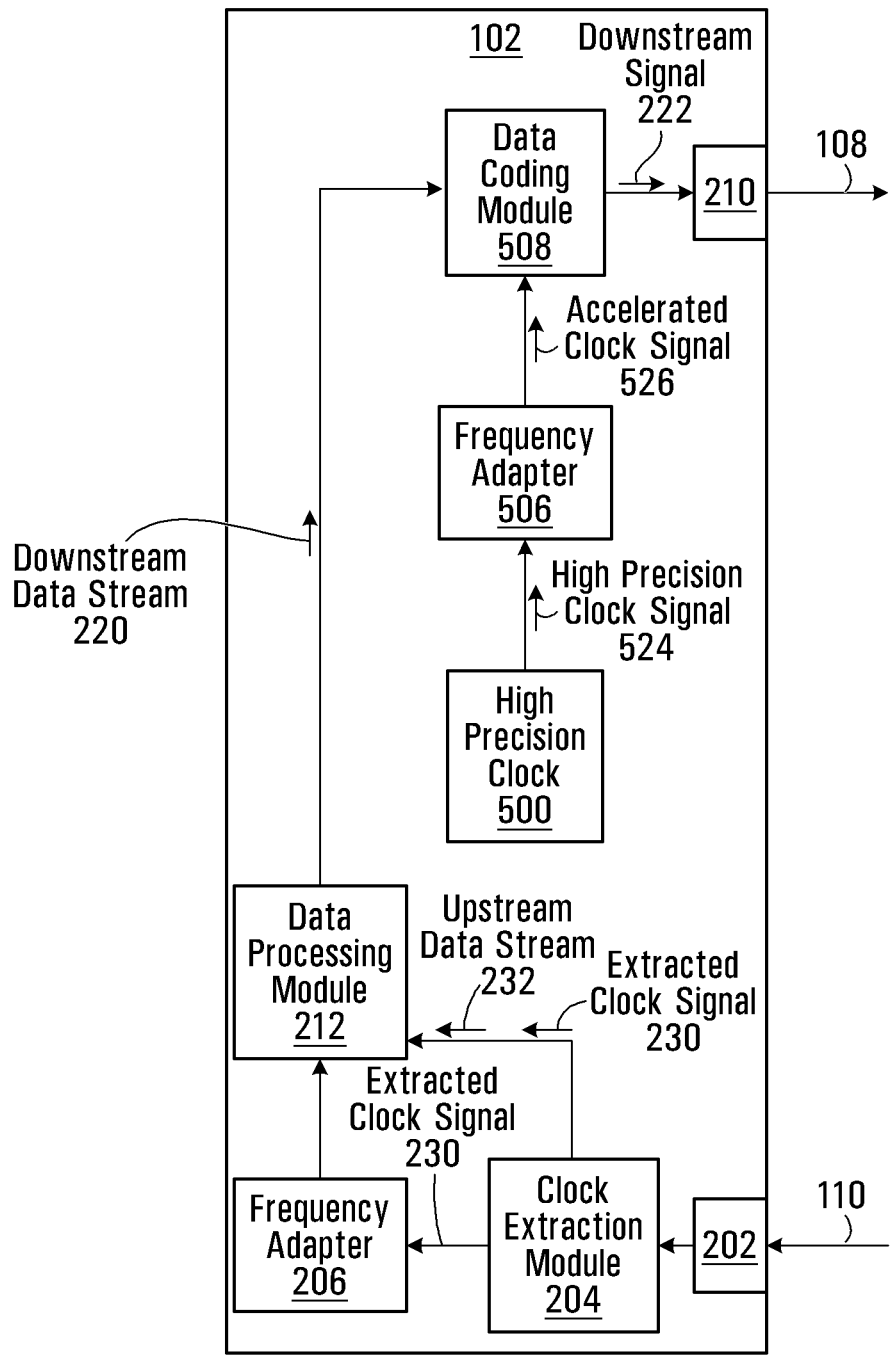
FIG. 5 is a block diagram of certain components of the first network element, in which is illustrated a frequency adapter for generating a clock frequency that is higher than the nominal frequency of the standard with which the first network element is rated as being compliant, in accordance with another non-limiting embodiment of the present invention.

Specifically, with reference to FIG. 5, there is shown a partial internal block diagram of certain elements of the first network element 102 in accordance with another non-limiting embodiment of the present invention. In the specific non-limiting embodiment being considered at present, the first network element 102 is the master node, while the second network element 104 is the slave node and thus will use an extracted version of a clock signal received from the first network element 102 to clock frames 112 destined for the first network element 102.

Therefore, the first network element 102 comprises a high-precision source clock 500, which is similar to the source clock 200 but in this case outputs a high precision clock signal 524 at a frequency that is within a stricter tolerance than what applies to the first network element 102. For instance, where the tolerance that applies to the first network element 102 is +/−100 ppm, the tolerance of the high-precision source clock 500 can be specified as +/−10 ppm, +/−5 ppm or +/−1 ppm, to give a few non-limiting examples. By way of non-limiting illustration, the high-precision source clock 500 may be a primary reference clock (PRC), such as can be obtained from GPS satellites or atomic-level oscillators. Also provided is a data coding module 508, which is identical to the data coding module 208 previously described but is in this case clocked by an output of a frequency adapter 506.

The frequency adapter 506 serves to accelerate the frequency of the signal 524 output by the high-precision source clock 500. For example, in a non-limiting embodiment, the frequency adapter 506 may comprise a fractional phase-locked loop (PLL) or other circuit adapted to implement a frequency multiplier, which outputs an accelerated clock signal 526 for use by the data coding module 508. The accelerated clock signal 526 output by the frequency adapter 506 therefore has a frequency that is higher than the actual frequency of the high-precision source clock 500 but can be kept to within the tolerance of the standard that applies to the first network element 102.

Here again, such standard may call for the presence of an inter-frame gap 226 between successive frames 112 being transmitted over the first or second communication paths 108, 110. However, recognizing that inter-frame gaps 226 are useful in mitigating the effect of sync slips, and further recognizing that sync slips are rendered less prevalent by the technique described above where the clock signal used by the second network element 104 to send frames 112 to the first network element 102 is synchronized to the clock signal used by the first network element 102 to send frames 112 to the second network element 104, one can contemplate reducing the size of the inter-frame gaps 226 to below the minimum recommended size. In fact, it is contemplated that the use of an inter-frame gap can be entirely eliminated during a period of high link utilization, since there is no practical need to account for sync slips that are not expected to occur. The net effect is an increase in the utilization of the capacity of the communication link 106 in both directions of communication.

It should also be understood that in some embodiments, one can utilize a high-precision source clock that runs at a frequency that is higher than the upper bound specified by the standard. For example, let the high-precision source clock 500 be specified to run at 1.25025 GHz+/−1 ppm. Here, the frequency adapter 506 can implement a fractional PLL or other circuit for decelerating the frequency of the signal 524 output by the high-precision source clock 500, to result in a decelerated clock signal whose frequency is still above the 1.25 GHz nominal frequency specified by the standard.

To gain a better appreciation of the capacity utilization of the communication link 106 that results from the various non-limiting embodiments described above, reference is made in the following Table 2, in which the rows correspond to different scenarios which assume a payload of 64 bytes per frame. Column 2 shows the frequency used by the data coding modules 508, 258 to clock data, while column 3 shows the effective data rate (i.e., payload bytes per second) over the first and second communication paths 108, 110.

TABLE 2

| | Frequency used by data coding modules 508, 258 | Sustained Effective data rate of $1^{st}$ or $2^{nd}$ comm. path |
|---|---|---|
| 1. Conventional | 1.25 GHz | 761.9048 Mb/s |
| 2. Accelerated | 1.2500125 GHz +89 ppm | 761.9726 Mb/s |
| 3. 8-byte IFG | 1.2500125 GHz +89 ppm | 800.0712 Mb/s |
| 4. No IFG | 1.2500125 GHz +89 ppm | 888.9680 Mb/s |

Note:
the nominal data rate (100% link utilization with nominal-size inter-frame gap) for 64-byte-packet Gigabit Ethernet is 761.9048 Mb/s Specifically, row 1 corresponds to a conventional synchronous scenario where the source clock in each of the first and second network elements 102, 104 is, say, a primary reference clock that operates at an actual frequency of 1.25 GHz. Additionally, this scenario assumes the standard practice of inserting an inter-frame gap 226 having a nominal size of 96 bit-lengths between successive frames 112 in order to compensate for sync slips—even though such sync slips are unlikely to occur due to the matching clock rates used by the first and second network elements 102, 104.

Row 2 corresponds to a non-limiting embodiment of the present invention where an accelerated clock signal has been used as described above. One can refer to the above example where the high-precision source clock 500 had a tolerance of +/−10 ppm, while the standard had a tolerance of +/−100 ppm. Thus, one can afford to accelerate the clock signal by +89 ppm while still remaining compliant with the standard. Additionally, this scenario continues to assume the standard practice of inserting an inter-frame gap 226 having a nominal size of 96 bit-lengths between successive frames 112. In this non-limiting example, it will be seen that the effective data rate that can be sustained over each of the first and second communication paths 108, 110 has been increased by 67.8 kbps.

Similarly to row 2, row 3 corresponds to a non-limiting embodiment of the present invention where an accelerated clock signal has been used as described above. In addition, in the scenario of row 3, the inter-frame gap 226 has been reduced to the minimum 64 bit-lengths between successive frames 112. In this non-limiting example, it will be seen that the effective data rate that can be sustained over each of the first and second communication paths 108, 110 has been increased by 38.1664 Mbps.

Similarly to rows 2 and 3, row 4 corresponds to a non-limiting embodiment of the present invention where an accelerated clock signal has been used as described above. In addition, in the scenario of row 4, the inter-frame gap 226 has been entirely eliminated. In this non-limiting example, it will be seen that the effective data rate that can be sustained over each of the first and second communication paths 108, 110 has been increased by 127.0632 Mbps.

It will be observed that in the scenario of row 1, the effective data rate is what is considered to be the maximum achievable using conventional approaches. For the scenarios of each of the other rows (2, 3 and 4), there is clearly an increase in the effective data rate that can be sustained over each of the first and second communication paths 108, 110.

It has thus been shown that a higher effective data rate can be obtained by accelerating a clock signal that has a stricter tolerance than that allowed by the applicable standard. Moreover, inter-frame gaps no longer have the same usefulness and indeed by reducing their size or eliminating them during a high utilization period, utilization of the capacity of the communication link can be further increased. Moreover, it should be apparent that the size of the payload can now be made arbitrarily large and to go even beyond the limits imposed by the standard with which the network elements are rated as being compliant. This is made possible because of the absence of the need to account for sync slips, whose occurrence will be significantly reduced once the second network element uses the clock derived from the first network element to clock frames of data to the first network element (or vice versa). As has been shown, the result can be a higher effective data rate.

Additionally, one notes that the lack of sync slips also means that one can reduce the memory requirements of the data processing modules 212, 262, which would previously have been sized in order to account for sync slips. This presents a step in the direction of bufferless asynchronous systems, which are particularly attractive in delay-sensitive applications such as streaming media.

Although reference has been made to the IEEE-802.3-2005 standard, it should be understood that embodiments of the present invention envisage the compliance with other communication standards, including other Ethernet standards (such as, without limitation: IEEE-802.3a; -802.3b; -802.3c; -802.3d; -802.3e; -802.3I; -802.3j; -802.3u; -802.3x; -802.3y; -802.3-1998; -802.3ab; -802.3ac; -802.3ad; -802.3-2002; 8-02.3ae; -802.3af; -802.3ah; -802.3ak; -802.3z; -802.3an; -802.3ap; -802.3aq; -802.3ar; -802.3as; -802.3at; -802.3au; -802.3av; -802.3 HSSG), asynchronous transfer mode (ATM) standards, frame relay (FR) standards, and the like.

Those skilled in the art will appreciate that in some embodiments, the functionality of various components of the first and second network elements may be implemented using pre-programmed hardware or firmware elements (e.g., application specific integrated circuits (ASICs), field programmable gate arrays (FPGAs), electrically erasable programmable read-only memories (EEPROMs), Flash, etc.), or other related components. In other embodiments, the functionality of various components of the first and second network elements may be achieved using a computing apparatus that has access to a code memory (not shown) which stores computer-readable program code for operation of the computing apparatus, in which case the computer-readable program code could be stored on a medium which is fixed, tangible and readable directly by such components, (e.g., removable diskette, CD-ROM, ROM, fixed disk, USB drive), or the computer-readable program code could be stored remotely but transmittable to such components via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

While specific embodiments of the present invention have been described and illustrated, it will be apparent to those skilled in the art that numerous modifications and variations can be made without departing from the scope of the invention as defined in the appended claims.

What is claimed is:

1. A method of communication between a first network element and a second network element, the method comprising:
    receiving, by the second network element from the first network element, a first signal carrying a first data stream clocked by a first clock signal;
    generating an extracted clock signal from the first signal received from the first network element;
    determining a relative speed of the extracted clock signal and a second clock signal available at the second network element;
    if the extracted clock signal is determined to be faster than the second clock signal, clocking a second data stream with the extracted clock signal to produce a second signal for transmission from the second network element to the first network element; and
    if the second clock signal is determined to be faster than the extracted clock signal, clocking the second data stream with the second clock signal to produce the second signal for transmission from the second network element to the first network element.

2. The method defined in claim 1, further comprising:
    if the second clock signal is determined to be faster than the extracted clock signal, generating an instruction to cause the first data stream to be clocked with a clock signal extracted from the second signal.

3. The method defined in claim 2, further comprising transmitting the second signal from the second network element to the first network element.

4. The method defined in claim 3, wherein determining the relative speed of the extracted clock signal and the second clock signal comprises measuring a frequency of the extracted clock signal and measuring a frequency of the second clock signal.

5. The method defined in claim 4, wherein measuring the frequency of the extracted clock signal and measuring the frequency of the second clock signal are performed by the second network element.

6. The method defined in claim 3, wherein determining the relative speed of the extracted clock signal and the second clock signal comprises obtaining an indication of the frequency of the first clock signal and measuring a frequency of the second clock signal.

7. The method defined in claim 6, wherein said indication is obtained in a message received from the first network element.

8. The method defined in claim 7, wherein measuring the frequency of the second clock signal is performed by the second network element.

9. The method defined in claim 8, wherein the frequency of the first clock signal is measured by the first network element.

10. The method defined in claim 1, wherein the first data stream comprises a sequence of frames.

11. The method defined in claim 10, the frames being first frames, wherein the second data stream comprises a sequence of second frames.

12. The method defined in claim 11, further comprising introducing an inter-frame gap between successive ones of the first frames in the first signal.

13. The method defined in claim 12, further comprising introducing an inter-frame gap between successive ones of the second frames in the second signal.

14. The method defined in claim 13, wherein the inter-frame gaps each occupy a nominal number of bytes defined by a standard with which the first and second network elements are rated as being compliant.

15. The method defined in claim 13, wherein the inter-frame gaps each occupy a number of bytes less than a minimum number of bytes defined by a standard with which the first and second network elements are rated as being compliant.

16. The method defined in claim 11, further comprising refraining from introducing an inter-frame gap between successive ones of the first frames in the first signal.

17. The method defined in claim 16, further comprising refraining from introducing an inter-frame gap between successive ones of the second frames in the second signal.

18. The method defined in claim 1, further comprising embedding the first clock signal in the first signal transmitted by the first network element.

19. The method defined in claim 18, further comprising embedding the extracted clock signal in the second signal transmitted by the second network element.

20. A method of communication between a first network element and a second network element, the method comprising:
receiving, by the second network element from the first network element, a first signal carrying a first data stream clocked by a first clock signal;
generating an extracted clock signal from the first signal received from the first network element;
determining a relative speed of the first clock signal and a second clock signal available at the second network element;
if the first clock signal is determined to be faster than the second clock signal, clocking a second data stream with the extracted clock signal to produce a second signal for transmission from the second network element to the first network element; and
if the second clock signal is determined to be faster than the extracted clock signal, clocking the second data stream with the second clock signal to produce the second signal for transmission from the second network element to the first network element.

21. The method defined in claim 20, further comprising:
if the second clock signal is determined to be faster than the first clock signal, generating an instruction to cause the first data stream to be clocked with a clock signal extracted from the second signal.

22. The method defined in claim 21, further comprising transmitting the second signal from the second network element to the first network element.

23. The method defined in claim 22, wherein determining the relative speed of the first clock signal and the second clock signal comprises consulting a memory element that stores frequencies of clock signals including a frequency of the first clock signal and a frequency of the second clock signal.

24. The method defined in claim 20, wherein the first data stream comprises a sequence of frames.

25. The method defined in claim 24, the frames being first frames, wherein the second data stream comprises a sequence of second frames.

26. The method defined in claim 25, further comprising introducing an inter-frame gap between successive ones of the first frames in the first signal.

27. The method defined in claim 26, further comprising introducing an inter-frame gap between successive ones of the second frames in the second signal.

28. The method defined in claim 27, wherein the inter-frame gaps each occupy a nominal number of bytes defined by a standard with which the first and second network elements are rated as being compliant.

29. The method defined in claim 27, wherein the inter-frame gaps each occupy a number of bytes less than a minimum number of bytes defined by a standard with which the first and second network elements are rated as being compliant.

30. The method defined in claim 25, further comprising refraining from introducing an inter-frame gap between successive ones of the first frames in the first signal.

31. The method defined in claim 30, further comprising refraining from introducing an inter-frame gap between successive ones of the second frames in the second signal.

32. The method defined in claim 20, further comprising embedding the first clock signal in the first signal transmitted by the first network element.

33. The method defined in claim 32, further comprising embedding the extracted clock signal in the second signal transmitted by the second network element.

34. A system for synchronizing a plurality of network devices in a network, the system comprising:
a first network device communicatively coupled to a communication link, the first network device comprising an interface configured to release over the communication link a first signal carrying a first data stream clocked by a first clock signal;
a second network device communicatively coupled to the communication link, the second network device comprising:
an interface configured to receive the first signal over the communication link;
a clock extraction module configured to generate an extracted clock signal from the received first signal;
a data coding module configured to clock a second data stream with an output clock signal selected based on a speed of a locally generated second clock signal relative to the extracted clock signal, thereby to produce a second signal for transmission from the second network device to the first network device, wherein if the extracted clock signal is determined to be faster than the second clock signal, the output clock signal is based on the extracted clock signal, and if the second clock signal is determined to be faster than the extracted clock signal, the output clock signal is based on the second clock signal.

35. The system defined in claim 34, wherein the first network device further comprises:
a source clock configured to synthesize the first clock signal.

36. The system defined in claim 35, wherein the first network device further comprises:
a data coding module configured to clock the first data stream with the first clock signal to produce the first signal for transmission to the second network device.

37. The system defined in claim 36, wherein the first and second network devices are rated as being compliant with a standard that defines a nominal frequency and a tolerance, wherein the source clock operates at a frequency that is greater than the nominal frequency.

38. The system defined in claim 36, the second network device comprising a multiplexer for acquiring either a first state in which the data coding module clocks the second data stream based on the extracted clock signal or a second state in which the data coding module clocks the second data stream based on the second clock signal, and further comprising a control module configured to set the multiplexer to either the first state or the second state.

39. The system defined in claim 38, the first network device comprising a control module configured to generate an instruction for controlling the state of the multiplexer and an interface configured to transmit said instruction to the second network device.

40. The system defined in claim 39, wherein to generate said instruction the control module in the first network device is configured to determine that the first clock signal is faster than the second clock signal.

41. The system defined in claim 40, wherein to determine that the first clock signal is faster than the second clock signal the control module in the first network device is configured to obtain a measurement of a frequency of the first clock signal and a measurement of a frequency of the second clock signal.

42. The system defined in claim 41, wherein the first network device comprises a source clock frequency measurement module for measuring the frequency of the first clock signal and an extracted clock frequency measurement module for measuring the frequency of the second clock signal.

43. The system defined in claim 41, wherein the first network device comprises a first source clock frequency measurement module for measuring the frequency of the first clock signal and wherein the second network device comprises a second source clock frequency measurement module for measuring the frequency of the second clock signal.

44. The system defined in claim 41, wherein the first network device comprises a first extracted clock frequency measurement module for measuring the frequency of the second clock signal and wherein the second network device comprises a second extracted clock frequency measurement module for measuring the frequency of the first clock signal.

45. A network device for communication with a first network device over a communication link, comprising:
an interface configured to receive from the first network device a downstream signal carrying a first data stream clocked by a first clock signal;
a clock extraction module configured to generate an extracted clock signal from the received first signal;
a data coding module configured to clock a second data stream with an output clock signal selected based on a speed of a locally generated second clock signal relative to the extracted clock signal, to produce an upstream signal destined for the first network device, wherein if the extracted clock signal is determined to be faster than the second clock signal, the output clock signal is based on the extracted clock signal and if the second clock signal is determined to be faster than the extracted clock signal the output clock signal is based on the second clock signal;
said interface being configured to release said upstream signal over the communication link.

* * * * *